US012174561B2

(12) United States Patent
Cohen et al.

(10) Patent No.: US 12,174,561 B2
(45) Date of Patent: Dec. 24, 2024

(54) HEATING FOR A PRINTING DRUM

(71) Applicant: Hewlett-Packard Development Company, L.P., Spring, TX (US)

(72) Inventors: Lavi Cohen, Ness Ziona (IL); Asaf Shoshani, Ness Ziona (IL); Yulia Haddad, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/907,118

(22) PCT Filed: Mar. 26, 2020

(86) PCT No.: PCT/US2020/024880

§ 371 (c)(1),
(2) Date: Sep. 23, 2022

(87) PCT Pub. No.: WO2021/194492

PCT Pub. Date: Sep. 30, 2021

(65) Prior Publication Data

US 2023/0148288 A1 May 11, 2023

(51) Int. Cl.

*G03G 15/10* (2006.01)
*G03G 15/00* (2006.01)
*G03G 21/20* (2006.01)

(52) U.S. Cl.

CPC ......... *G03G 15/104* (2013.01); *G03G 15/751* (2013.01); *G03G 21/20* (2013.01); *G03G 2215/0658* (2013.01)

(58) Field of Classification Search

CPC . G03G 15/751–752; G03G 2221/0084; G03G 15/10–11

See application file for complete search history.

(56) References Cited

U.S. PATENT DOCUMENTS

| | | | | |
|---|---|---|---|---|
| 4,607,936 | A * | 8/1986 | Miyakawa | G03G 21/203 399/92 |
| 5,659,848 | A | 8/1997 | Jeon | |
| 6,122,467 | A * | 9/2000 | Ehara | G03G 5/104 399/174 |
| 6,670,588 | B2 | 12/2003 | Kitano et al. | |
| 6,713,728 | B1 | 3/2004 | Justice et al. | |
| 6,744,014 | B1 * | 6/2004 | Tanamachi | G03D 13/002 219/471 |
| 2002/0031381 | A1 | 3/2002 | Miyahara et al. | |
| 2006/0104668 | A1 | 5/2006 | Nomura et al. | |
| 2007/0045295 | A1 | 3/2007 | Hays et al. | |
| 2018/0321630 | A1 * | 11/2018 | Diamant | G03G 21/0058 |

FOREIGN PATENT DOCUMENTS

| | | | | |
|---|---|---|---|---|
| CN | 106255244 A * | 12/2016 | | H05B 3/56 |
| EP | 1217466 B1 | 5/2005 | | |
| JP | 60129772 A * | 7/1985 | | |

(Continued)

*Primary Examiner* — Leon W Rhodes, Jr.
(74) *Attorney, Agent, or Firm* — Jordan IP Law, LLC

(57) ABSTRACT

A printing drum for a liquid electrophotographic printing system which comprises a photosensitive surface and a heating device mounted to the printing drum. The heating device heats the photosensitive surface of the printing drum to a predetermined temperature.

6 Claims, 7 Drawing Sheets

(56) References Cited

FOREIGN PATENT DOCUMENTS

| | | | | |
|---|---|---|---|---|
| JP | 2000275885 | A | * | 10/2000 |
| JP | 3577452 | B2 | | 10/2004 |
| JP | 2006154648 | A | * | 6/2006 |
| JP | 2008134369 | A | * | 6/2008 |
| JP | 2011-123332 | A | | 6/2011 |
| JP | 5355155 | B2 | | 11/2013 |
| WO | 2016/041598 | A1 | | 3/2016 |

* cited by examiner

HEATING FOR A PRINTING DRUM

BACKGROUND

The description is related to a heating device of a printing drum in a liquid electrophotographic (LEP) printing system.

BRIEF DESCRIPTION OF THE DRAWINGS

Features of examples will be described, by way of example, in the following detailed description with reference to the accompanying drawings in which like reference numerals correspond to similar, though perhaps not identical, components. For the sake of brevity, reference numerals or features having a previously described function may or may not be described in connection with other drawings in which they appear.

Non-limiting examples will now be described with reference to the accompanying drawings, in which.

Figure 1:
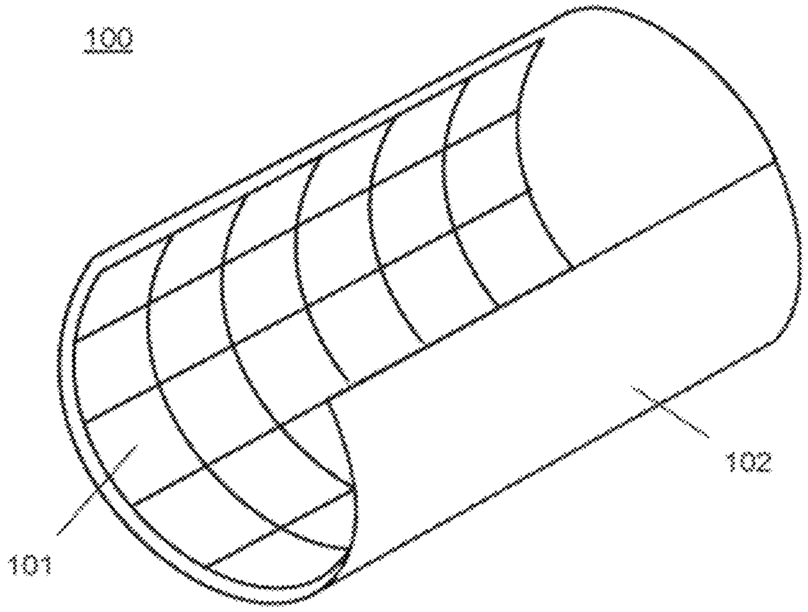
FIG. 1 shows a simplified perspective view of a cut-open example of a printing drum of a LEP printing system.

The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some printing systems, a latent print image may be generated on the exterior of a printing drum. A print agent may be applied to the latent print image to create a print image. The print image may then be transferred to substrate to create a printed image.

For example, a liquid electrophotographic (LEP) printing system may comprise a printing drum with a photosensitive surface on which a print image may be created as described herein. The photosensitive surface may be uniformly charged by a photoconductor charging unit, before a writing head selectively discharges pixels of the photosensitive surface to form a latent electrostatic image. A print agent may be attracted to or repelled from a pixel of the latent electrostatic image depending on the electrostatic potential of the respective pixel to create a print image. The resulting print image is then transferred to a substrate to create a printed image.

In some examples, an intermediate member transfers the print image from the photosensitive surface of the printing drum to the substrate. The intermediate member is heated to melt and blend print agent particles into a smooth film. Hence, the print image may be defined on the intermediate member. Upon contact with the cooler substrate, the print image solidifies and the printed image is generated. In other examples, where the print image is directly transferred to substrate, the substrate may be heated to permanently fuse and dry the print image.

In some example LEP printing systems, the intermediate member has a temperature during operation considerably higher than, for instance, ambient temperature, such that the print agent particles are heated and melted. In some LEP printing systems, heating the intermediate member e.g. after a break or standby, may present a time bottleneck in the overall printing process.

In various LEP printing systems, the intermediate member to transfer ink to media is a belt. In other LEP printing systems, the intermediate member is a blanket, a blanket belt or a drum. In some examples, the print image is transferred by contact to the substrate. In other examples, the print image is transferred to the substrate via an electric field. The substrate may in principle comprise any material, including paper, card, plastics, or fabric.

The print agent may comprise ink, toner, coating and the like. The ink may be powdered or liquid, such as liquid ink. The liquid ink may contain a carrier liquid, such as imaging oil, and ink particles which are pigments that are encapsulated by a resin. The electrostatically charged photosensitive surface of the printing drum controls placement of the ink particles.

In various LEP printing systems, the photosensitive surface of the printing drum may provide a predetermined temperature distribution for the development of the print agent. In some examples, the predetermined temperature distribution may be uniform. In other examples, the predetermined temperature distribution may be non-uniform. This temperature distribution may on average be higher than the ambient temperature of the LEP printing system.

During a printing process, the photosensitive surface of the printing drum may experience unfavorable heat loss which could hinder the achievement of the predetermined temperature distribution. The heat loss may be higher at the lateral ends of the printing drum than, for instance, at the middle part of the printing drum. This may be attributed to endcaps which may close the printing drum at lateral ends and which may have a relatively high heat capacity. Various LEP printing systems may provide a number of different printing job formats. Hence, the predetermined temperature distribution may also be based on the dimensions of the printing job.

In some examples, a bi-product may be accumulated on the photosensitive surface of the printing drum. This bi-product may be accumulated during one or several printing processes. This bi-product, also known as “oxidized imaging oil”, may comprise residual imaging oil, ink particles or other contaminations. The oxidized imaging oil may experience oxidation when exposed to the photoconductor charging unit and remain chemically attached to the photosensitive surface of the printing drum. It is hypothesized that the oxidized imaging oil may absorb moisture which alters the surface conductivity of the photosensitive surface of the printing drum. As a result of the oxidized imaging oil, the print agent moves or roams over the surface which causes print inaccuracies and severe print quality (PQ) effects over time.

In various LEP printing systems, the oxidized imaging oil may also cause damage to the sensitive intermediate member. Regular replacement of the photosensitive surface of the drum or the damaged intermediate member can, however, be undesired from an economic point of view.

Empirical tests have shown that heating up the photosensitive surface of the printing drum to a temperature higher than 80° C. significantly improves PQ. It is hypothesized that temperatures higher than 80° C. evaporate the moisture of the oxidized imaging oil attached to the photosensitive surface of the printing drum. The drying of the oxidized imaging oil therefore weakens its adherence to the photosensitive surface and thus enables its removal from the latter. Another hypothesis is that heating the oxidized imaging oil enriches the latter with oxygen which enables stronger OH-connections with a removal medium and thereby allows easier removal of the oxidized imaging oil layer.

"Photosensitive surface" is to be understood herein as a surface which may be partially charged or discharged when exposed to light. It is also capable of holding the charge when in the dark. Photosensitive surfaces may comprise amorphous silicon, organic photo conductor (OPC), inorganic photo conductor, photo conductive polymers, selenium or any type of other photoconductive surface.

FIGS. 1-13 show a printing drum of a LEP printing system and related methods wherein like reference numerals correspond to the same components. Now referring to FIG. 1 which shows a perspective view of a printing drum 100, wherein the printing drum 100 has been cut-open to allow a look inside the printing drum 100.

The printing drum 100 comprises a photosensitive surface 102. The photosensitive surface 102 may completely enclose the cylindric surface of the printing drum 100 with exception of the lateral sides. In another example, the photosensitive surface 102 may cover the cylindric surface of the printing drum 100 in part.

Further, the printing drum 100 comprises a plurality of heating pads 101 and a controller (not shown). The controller is electrically coupled to the plurality of heating pads 101 and is to control independently at least two or up to all of the plurality of heating pads 101 such that the photosensitive surface of the printing drum 100 is heated to a temperature having a predetermined temperature distribution. The plurality of heating pads 101 can be combined into groups, with the groups being controlled independently of one another to achieve the predetermined temperature distribution.

In various LEP printing system, the predetermined temperature distribution of the photosensitive surface 102 of the printing drum 100 may depend on development of the print agent and the process the printing system is to perform. Herein, the controller may control the temperature distribution of the photosensitive surface for at least four distinct processes of the LEP printing system accordingly which are described hereinafter in more detail.

The predetermined temperature distribution may describe a temperature distribution on the surface of the printing drum 100 along the longitudinal axis of the printing drum 100, in circumferential direction of the printing drum 100 or in any combination of these. The temperature distribution may be constant over the surface of the printing drum 100. The controller is to control the heating pads such that the predetermined temperature distribution is achieved and maintained on the surface of the printing drum 100, for instance by balancing heat losses to the environment or to the end caps of the printing drum 100. Such heat losses may be non-uniform along the photosensitive surface. Also, the controller is to control the heating pads such that the photosensitive surface of the printing drum may be based on a format of a printing job. The controller may heat a certain area of the photosensitive surface which corresponds to the height and width of a printing job format.

During a ready-to-print process, the controller is to control the plurality of heating pads such that the photosensitive surface is heated to a printing temperature from e.g. ambient temperature. The ready-to-print process may be designated to reach the point in time for the printing to start within a short time and is particularly suitable for e.g. starting the printing drum of a LEP printing system after a break or standby. The printing temperature may be a temperature in a range between 30 and 50° C., in particular between 35 and 45° C., more particular between 38 and 42° C. In other examples, the printing temperature may be in a range between 4° and 49° C., in particular between 43 and 48° C. In yet another example, the printing temperature may be in range between 3° and 39° C., more particular in a range between 31 and 34° C. In another example, the printing temperature is 40° C. Various LEP printing system have a constant printing temperature.

During a quality enhancing process, the photosensitive surface has a temperature higher than 80° C. The print quality enhancing process may be performed between a time range of 30 minutes and 6 hours. In some examples, a temperature for the quality enhancing process may be in a temperature range between 9° and 110° C., in particular between 95 and 105° C., more particular between 98 and 102° C. In another example, the temperature for the quality enhancing process temperature may be in a range between 80 and 90° C., more particular between 84 and 89° C. In yet another example, the print quality enhancing temperature may be in a temperature range between 11° and 130° C., in particular between 115 and 125° C.

During a press priming process the photosensitive surface has a temperature higher than 80° C. to heat an intermediate member of the LEP printing system. The intermediate member may be a belt which transfers the print image to the substrate. By supporting heating of the intermediate member with the printing drums, the startup time of a LEP system may decrease. For press priming, the intermediate member is selectively engaged with the printing drum to enable heat transfer. In some examples, the temperature for the press priming process may be in a temperature range between 9° and 110° C., in particular between 95 and 105° C., more particular between 98 and 102° C. In another example, the temperature for the press priming process temperature may be in a range between 8° and 90° C., more particular between 84 and 89° C. In yet another example, the press priming temperature may be in a temperature range between 110 and 120° C. In some LEP printing systems, the photosensitive surface 102 heats the intermediate member such that a temperature equilibrium between the surface 102 and the intermediate member may develop. Other LEP printing systems may provide an additional heating element and the photosensitive surface 102 of the printing drum 100 may support the additional heating element in heating the intermediate member during the press priming process as will be described hereinafter. In some LEP printing systems, a sensor may sense the temperature of the intermediate member and may provide feedback to the controller. In other LEP printing systems, the control mechanism is based on empirical data.

In some examples, the controller can control various components and operations of the printing drum 100 to facilitate the processing and printing as generally described herein, such as controllably heating the photosensitive surface of the printing drum. In addition, the controller may also communicate with further components of the LEP printing system. An example controller may include a processor (CPU) and a memory. The controller may additionally include other electronics (not shown) for communicating with various components of the printing drum as well as the LEP printing systems.

In one example, the controller is to control the plurality of heating pads without feedback about the actual temperature of the heating pads or the photosensitive surface, based on empirical data prestored in the controller. In another example, the controller is to control the plurality of heating pads based on temperature feedback at least from one of the plurality of heating pads and the photoconductive surface.

The plurality of heating pads 101 may be arranged along the longitudinal axis of the printing drum 100, parallel to the longitudinal axis of the printing drum 100, enclosing an angle with the longitudinal axis of the printing drum 100, in circumferential direction of the printing drum 100 or in any combination of these. The shape of an individual heating pad may be formed in circular, triangular, rectangular, polygonal, trapezoidal, or another shape. The height of the heating pads may be rather small compared to their two-dimensional shape. In some examples, the plurality of heating pads 101 is arranged to cover a surface of the printing drum 100 completely. In another example, the individual heating pads of the plurality of heating pads 101 are distributed over at least one distinct areas of the surface of the printing drum and, thus, cover its surface in part. In one example, the individual heating pads may be arranged physically adjacent to each other. In another example, the individual heating pads 101 may be arranged spaced apart from each other.

The printing drum 100 may comprises a hollow cylindrical element having an inner and an outer surface. The printing drum 100 may be comprise a firm surface material and rotatably suspended on one or both lateral ends within the LEP printing system. The photosensitive surface 102 of the printing drum 100 may comprise amorphous silicon or organic photoconductor and the plurality of heating pads 101 may be mounted to the inner surface of the hollow cylindrical element.

In one example, the plurality of heating pads 101 is arranged to the inner surface of the printing drum 100. The plurality of heating pads 101 may be arranged with a heat-conductive adhesive to the printing drum. In an example printing drum 100, the plurality of heating pads 101 may be electrically and optically insulated and liquidly sealed from other subsystems of the LEP printing system to avoid unfavorable interferences with these subsystems.

In various LEP printing systems, the plurality of heating pads 101 may comprise any of a rod heater, a film heater, a heating coil or a radiant heater. In another LEP printing systems, the plurality of heating pads 101 may comprise any other suitable heater which does not interfere in an unnecessary manner with any other subsystems of the LEP printing system.

Figure 2:
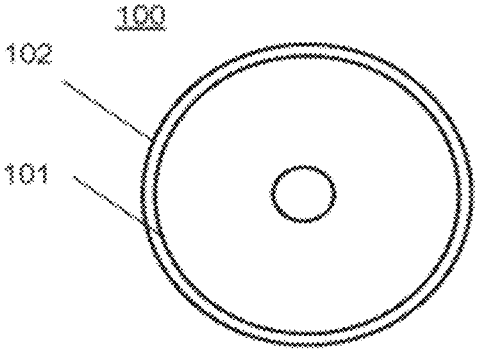
FIG. 2 shows a simplified front view of an example of the printing drum of a LEP printing system.
Figure 3:
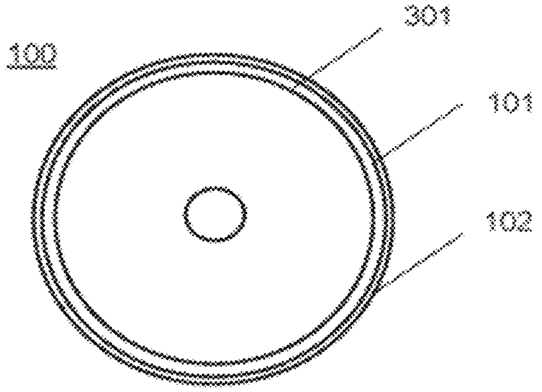
FIG. 3 shows a simplified front view of a further example of the printing drum of a LEP printing system.

FIGS. 2 and 3 each show an example of the printing drum 100 as described herein. In FIG. 2, similar to FIG. 1, a layer of the plurality of heating pads 101 is mounted to the inner surface of printing drum 100 which comprises a photosensitive surface 102.

In FIG. 3, a layer of the plurality of heating pads 101 is mounted between the outer surface of a cylindrical element 301 of the printing drum 100 and the photosensitive surface 102 of the printing drum. In this example, the photosensitive surface 102 of the printing drum 100 may comprise a photo imaging plate (PIP) foil. Another example printing drum may comprise two or more layers of the plurality of heating pads and thus different sandwich structures with the cylindrical element and underneath the photosensitive surface 102 of the printing drum 100.

Figure 4A:
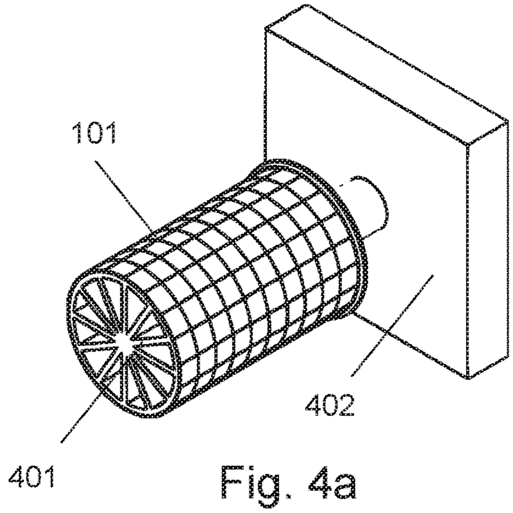
FIGS. 4*a*-4*c* show a simplified perspective view of a mounting arrangement of an example printing drum of a LEP printing system.
Figure 4B:
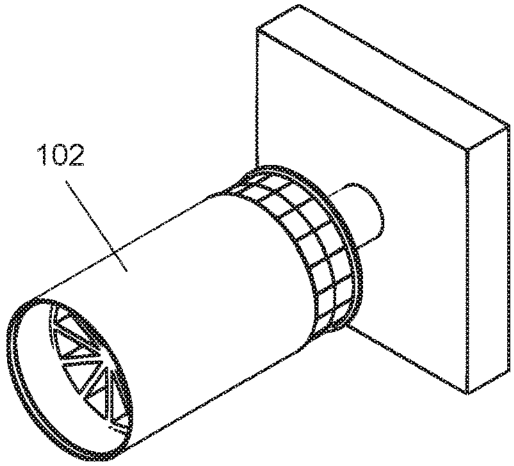
Figure 4C:
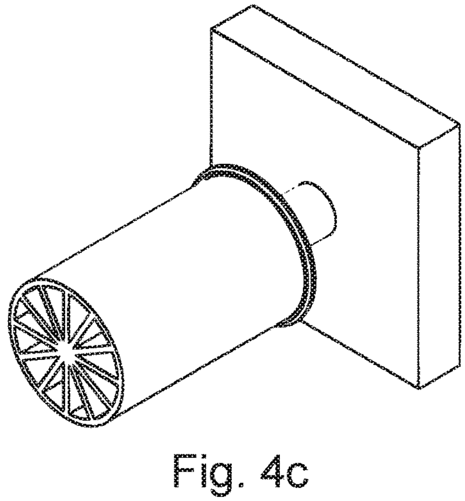

FIGS. 4*a*-4*c* show further examples of the printing drum 100 as described herein. The printing drum 100 comprises a mounting element 401 on which the hollow cylindrical element of the printing drum 100 will be placed. The plurality of heating pads 101 is arranged on the mounting element such that heat is exchanged with the inner surface of the hollow cylindrical element to heat the photosensitive surface 101 of the printing drum 100.

In particular, FIG. 4*a* shows a circumferential layer of the plurality of heating pads mounted to the mounting element 401. The mounting element 401 may be a rod, a shaft, or any other kind of elongated element. The mounting element 401 may be attached to a suspension 402 with one of its lateral ends. In another example, the mounting element may be attached to a suspension with both of its lateral ends. The mounting element may be rotatably attached to the suspension 402 and may be connected to a drive which rotates the mounting element relative to the suspension 402. In another example, the mounting element may be fixed and the layer of the plurality of heating pads may be rotatably attached to the mounting element and may be connected to a drive which rotates the plurality of heating pads.

FIGS. 4*b* and 4*c* show the mounting process of the printing drum 100 to the mounting element and the layer of the plurality of heating pads. In FIG. 4*b*, the printing drum 100 is mounted to the mounting element 401 in part, whereas FIG. 4*c* shows the printing drum 100 mounted completely on the mounting element 401 and over the layer of the plurality of heating pads ready for use within a LEP printing system.

In one example, both, the mounting element and the plurality of heating pads may be fixed while the hollow cylinder of the printing drum 100 is rotatably mounted to the mounting element and, thus, rotated relative to the mounting element and the layer of the plurality of heating pads.

In various LEP printing systems, the mounting element 401, the layer of the plurality of heating pads and the hollow cylindric element may be arranged physically adjacent to each other. In another LEP printing systems, the mounting element, the plurality of heating pads and the hollow cylindric element may be arranged apart from each other thereby enclosing spaces. In the latter system, these spaces in may be filled with a heat-conducting medium.

Figure 5:
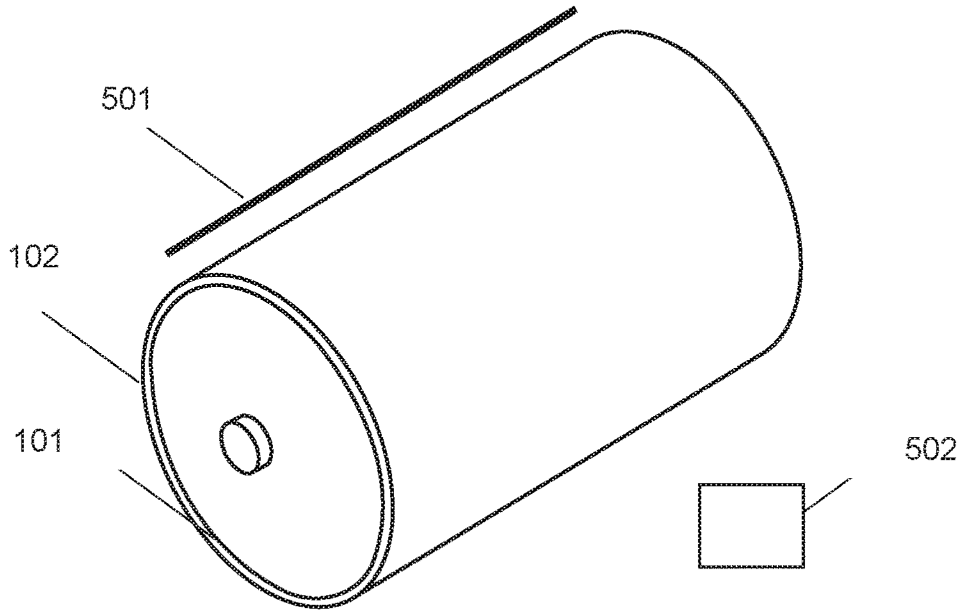
FIG. 5 shows a simplified perspective view of an example of the printing drum of a LEP printing system comprising a temperature sensor.

FIG. 5 shows another example of the printing drum 100 as described herein which comprises a temperature sensor 501 (schematically shown). The temperature sensor 501 is electrically coupled with the controller 502 to sense the temperature distribution of the photosensitive surface 102 and to feedback the temperature distribution to the controller. The controller is to control the heating pads 101 independently in response to the sensed temperature distribution. In one example, the temperature sensor 501 may be an infrared camera. In another example, the temperature sensor 501 may be resistance based or semiconductor based. In some examples, the temperature sensor 501 may sense the temperature distribution along the entire length of the printing drum 100. In other examples, the temperature sensor 501 may sense the temperature distribution where the heating pads are arranged.

Figure 6:
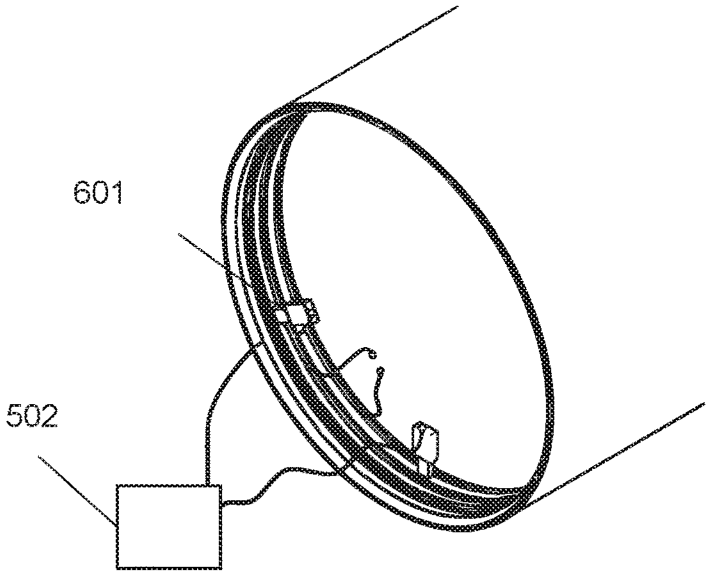
FIG. 6 shows a simplified perspective view of an example of the printing drum of a LEP printing system comprising electrical connections.

FIG. 6 shows an example of the printing drum 100 wherein the controller is electrically connected to the plurality of heating pads via a rotating electrical connection 601. The rotating electrical connection may comprise any of brush-ring connection and a slip-ring connection. In another example, the controller is connected to the plurality of heating pads wirelessly to control power outtake from a main power supply. Each individual heating pads may comprise a wireless interface to receive signals. In another example, the plurality of heating pads may comprise a wireless interface to receive signals. In yet another example, the heating drum comprises an arrangement for wireless power transfer to the plurality of heating pads.

In a further example, an electrical circuit connecting the plurality of heating pads to the controller may be designed to include electrical components to support the predetermined temperature distribution e.g. by generating more heating power towards the lateral ends of the printing drum.

Various LEP printing systems may comprise at least one printing drum as described herein. Other LEP printing system may comprise a number of printing drums which corresponds to the number of printing colors provided for printing.

Figure 7:
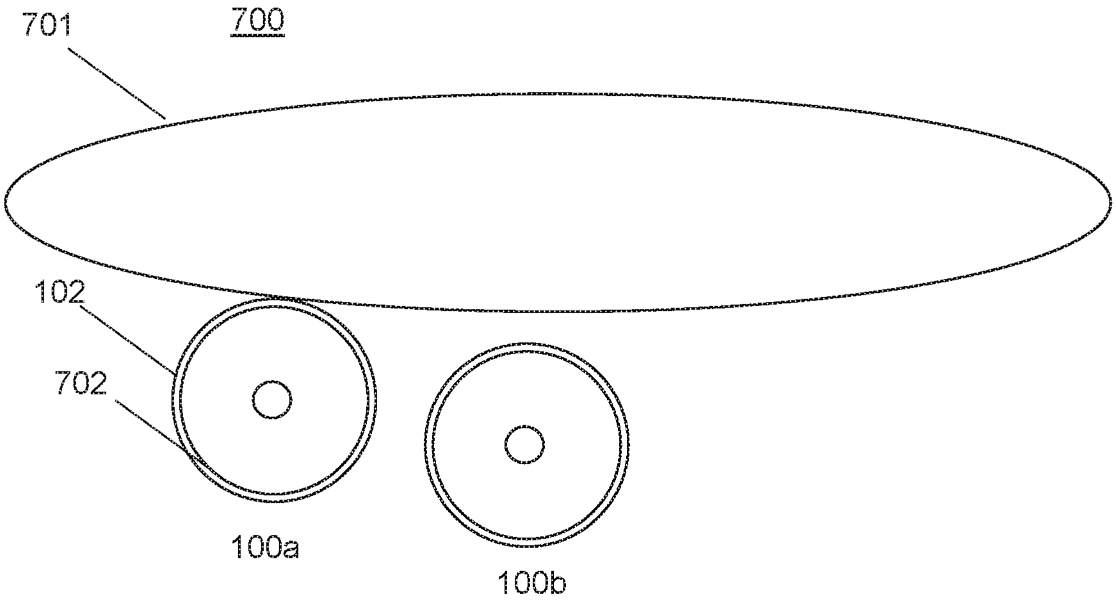
FIG. 7 shows a simplified front view of two example printing drums, with one printing drum engaged with an intermediate member of a LEP printing system.

Now turning to FIG. 7 which shows an example LEP printing system 700. The LEP printing system 700 comprises an intermediate member 701 and two printing drums 100*a* and 100*b*. The printing drums comprise a photosensitive surface 102, a heating device 702 and a controller (not shown) which is electrically coupled with the heating device 702. The controller is to control the heating device 702 such that the photosensitive surface is heated to a press priming temperature higher than 80° C. to heat the intermediate member during the press-priming process. The printing drums 100*a*, 100*b* are arranged to be selectively engaged with the intermediate member 701. In FIG. 7, printing drum 100*a* is selectively engaged with the intermediate member 701, while printing drum 100*b* is selectively disengaged from the intermediate member 701. When engaged with the intermediate member, the printing drums may transfer heat to the intermediate member In one LEP example, "engage" means physical contact between the printing drum and the intermediate member. In this case, heat may be transferred by heat conduction through physical contact between the printing drum 100 and the intermediate member 701. Also, a print image may be transferred by physical contact from the photosensitive surface 102 of the printing drum 100 to the intermediate member 702. In another LEP printing system, "engage" allows a specific distance between the printing drum 100 and the intermediate member 701. In this case, heat may be transferred, for example, by heat radiation from the printing drum 100 to the intermediate member 701. Also, a print image may be transferred by means of an electrical field between the photosensitive surface 102 of the printing drum and the intermediate member 701. In contrast, "disengage" means no interaction between the printing drum 100 and the intermediate member 710.

In various LEP printing system, an engaging mechanism (not shown) may be provided to engage the printing drum 100 with the intermediate member 701. Such an engaging mechanism may either engage a moveable mounted printing drum with the static intermediate member 701 or a printing drum 100 with its longitudinal axis statically mounted and a moveable mounted intermediate member 701. In one example, the controller 502 may control the engaging mechanism. In another example, the controller 502 may communicate with the other subsystems of the LEP printing system 700 to coordinate the heating processes with the engaging mechanism.

In various LEP printing system the heating device may comprise a plurality of heating pads and the controller is electrically coupled with the plurality of heating pads to control the temperature of the heating pads independently such that the photosensitive surface is heated to a determined temperature. This predetermined temperature of the photosensitive surface 102 as well as the position of the printing drum 100 with respect to the intermediate member 701 may depend on the process that is being performed. As described herein, the predetermined temperature has to be in a temperature range between 30° C. and 50° C. during a printing process or a ready-to-print process. During a print quality enhancing process, the temperature has to be higher than 80° C. to enhance the print quality of the photosensitive surface 102. The print quality enhancing temperature may be between 90 and 110° C. The at least one printing drum is selectively disengaged from the intermediate member during the ready-to-printing process and the print quality enhancing process whereas it is selectively engaged with the intermediate member during the printing process.

In various LEP printing systems, the heating device 702 may comprise any of a rod heater, a film heater, a heating pad, a heating coil or a radiant heater. In another LEP printing systems, the heating device 702 may comprise any other suitable heater which does not interfere in an unnecessary manner with any other subsystems of the LEP printing system.

Figure 8:
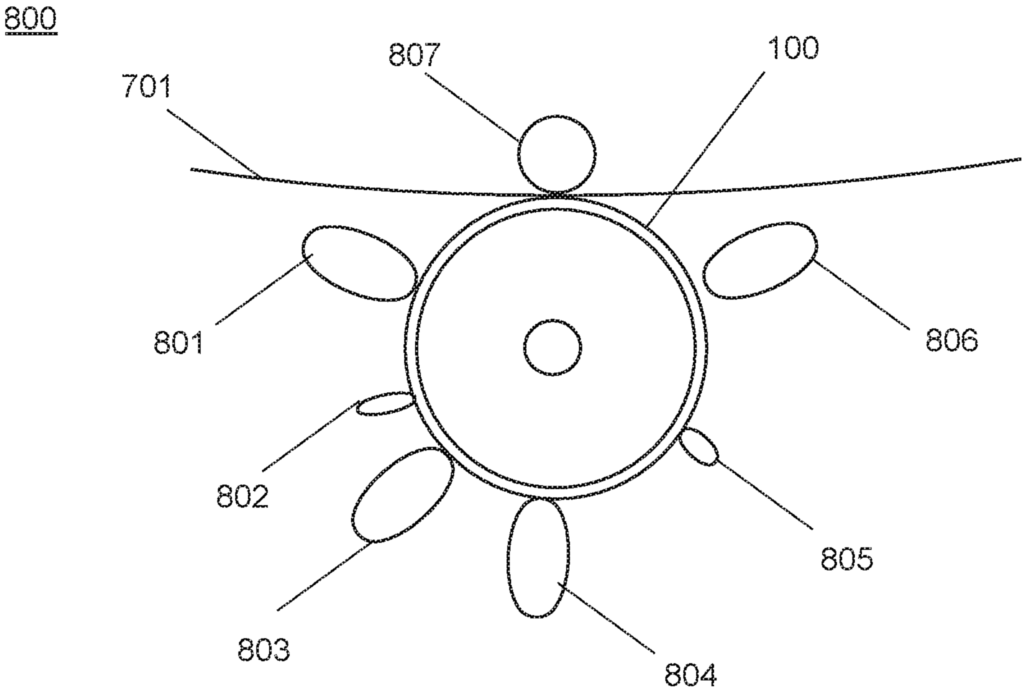
FIG. 8 shows a simplified front view of an example LEP printing system with an example printing drum.

FIG. 8 shows a simplified front view of an example LEP printing system 800 with an example printing drum 100 as described herein. The LEP printing system 800 further comprises the intermediate member 701 which is arranged to selectively engage with the printing drum 100. The LEP printing system may further comprise a cleaning station 801. The cleaning station 801 may be arranged to mechanically clean the photosensitive surface of the printing drum 100 by exposing it to an electrically neutral soft plastic blade and rotating sponge after the print image has been transferred to the intermediate member. Thereby, remaining toner and/or ink may be mechanically removed from the photosensitive surface of the printing drum 100.

The LEP printing system 800 may further comprise a charging unit 802 which may deposit a substantially uniform static charge on the exterior of the photosensitive surface of the printing drum 100. In some examples, the charging unit 802 may apply a corona discharge onto the photosensitive surface. The photosensitive surface is then exposed to light by a writing head 803 to selectively discharge pixels on the photosensitive surface of the printing drum 100. This results in a latent electrostatic image on the photosensitive surface of the printing drum.

Various LEP printing systems 800 may comprise a print agent applicator 804. The print agent applicator, for instance a binary ink developer (BID) may develop and supply electrostatic ink. Also, an electrometer 805 to measure the potential of the photosensitive surface may be comprised in an example LEP printing system 800.

The LEP printing system 800 may also include a print transfer erase (PTE) unit 806 to erase the electrostatic potential from the photosensitive surface by exposing it to light before the print image is transferred to the intermediate member 701. Thereby, print quality issues at a backing roller 807 are avoided. The backing roller 807 squeezes the intermediate member 701 against the photosensitive surface of the printing drum 100 to transfer the print image to the intermediate member 701. The intermediate member 701 then transfers the print image to substrate.

Some print processes are performed with a number of printing systems 800 that are connected by one intermediate member 701. Each printing system 800 may apply a specific print agent to the intermediate member 701 thereby forming one layer of the print image. In one example, the number of printing systems 800 may correspond to the number of differently colored print agents provided in the print process.

Example methods of heating the photosensitive surface of a printing drum in a liquid electrophotographic printing system are shown in FIGS. 9-13. The methods may be performed by controller 502. The methods may be applied to any of the example printing drums described above with respect to FIGS. 1-8.

Figure 9:
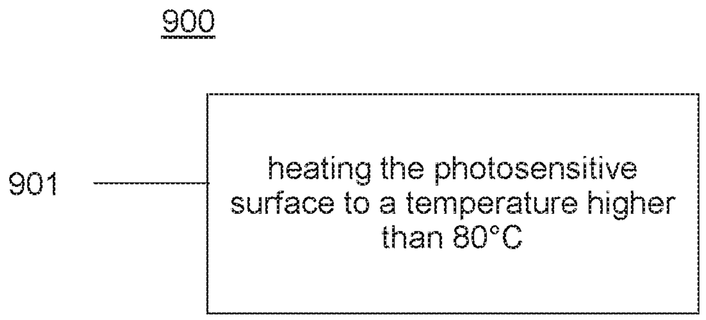
FIG. 9-FIG. 14 show examples of a method to enhance the print quality of a photosensitive surface of a printing drum in a LEP printing system.

Now turning to FIG. 9 which shows a method 900. Method 900 comprises heating the photosensitive surface 102 with a heating device mounted to the printing drum to a temperature higher than 80° C. during at least one of a print quality enhancing process to enhance the print quality of the photosensitive surface and a press priming process in block 901. The controller is to control the heating pads such that the temperature higher than 80° C. occurs in non-printing mode and is avoided during the printing process and the ready-to-print process.

Figure 10:
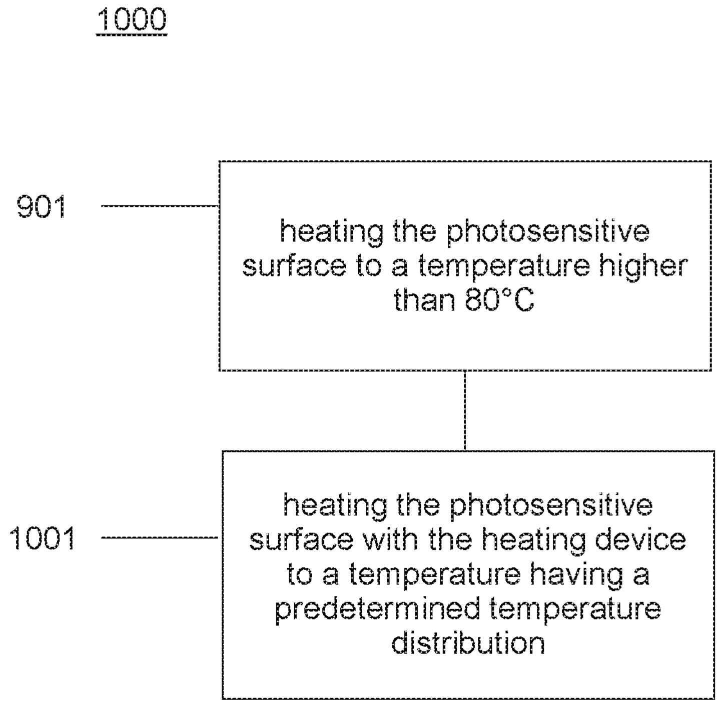

In FIG. 10, a further example method 1000 for heating the photosensitive surface 102 is shown. Method 1000 comprises, in block 901, the method 900 and, in block 1001, additionally heating the photosensitive surface 102 with the heating device, which comprises a plurality of heating pads, to a temperature having a predetermined temperature distribution. As described herein, the temperature distribution may be uniform or non-uniform and depending on the various processes of the LEP printing system.

Figure 11:
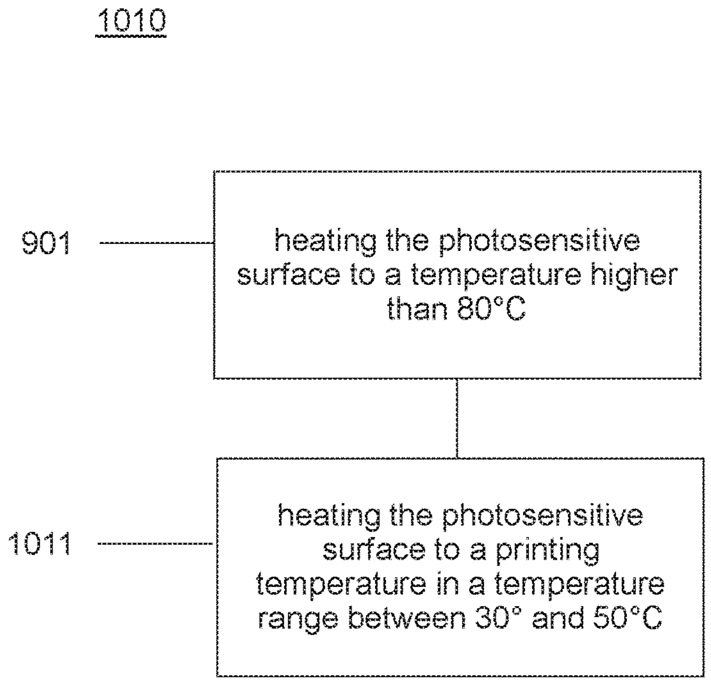

FIG. 11 shows a further example method 1010 for heating the photosensitive surface 102 which comprises block 901. When block 901 is performed within a press priming process, wherein the intermediate member is heated to its operating temperature during a printing process, the controller may control the heating device such that the heating device supports an additional heating element of the LEP printing system. The controller may control the heating device such that it stops at a certain point in time. The point in time is determined such that it leaves sufficient time for the photosensitive surface to cool down to the printing temperature for the printing process. The heating device may be stopped before the intermediate member has reached its operating temperature. The point in time is also determined such that the additional heating element of the LEP printing system may compensate for the remaining temperature gap of the intermediate member to its operating temperature.

The result is that the photosensitive surface and the intermediate member reach their respective temperature for printing and operating at the same time. The additional heating element of the LEP system may comprise at least one fan heater. Thus, during the press priming process, the heating device may support an additional heating element of the LEP system in heating the intermediate member to its operating temperature. Above-described temperature ranges for the press priming temperature of the photosensitive surface may also apply for the temperature of the intermediate member for operating. Thus, the intermediate member may have a temperature higher than 80° C., in particular any of the above-described temperature ranges, during operating within the LEP printing system.

Method 1010 further comprises in block 1011 heating the photosensitive surface to a printing temperature in a temperature range between 30° and 50° C. during at least one of a ready-to-print process and a printing process.

Figure 12:
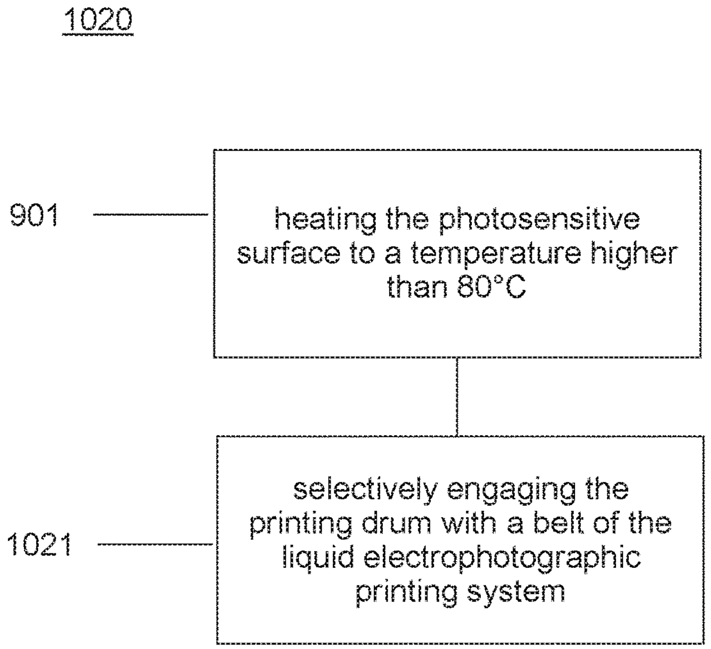

FIG. 12 shows a further example method 1020 for heating the photosensitive surface which comprises, in addition to block 901 with method 900, a block 1021 of selectively engaging the printing drum with an intermediate member of the liquid electrophotographic printing system during a printing process and heating, by means of the heating device of the printing drum, the intermediate member during the printing process.

Figure 13:
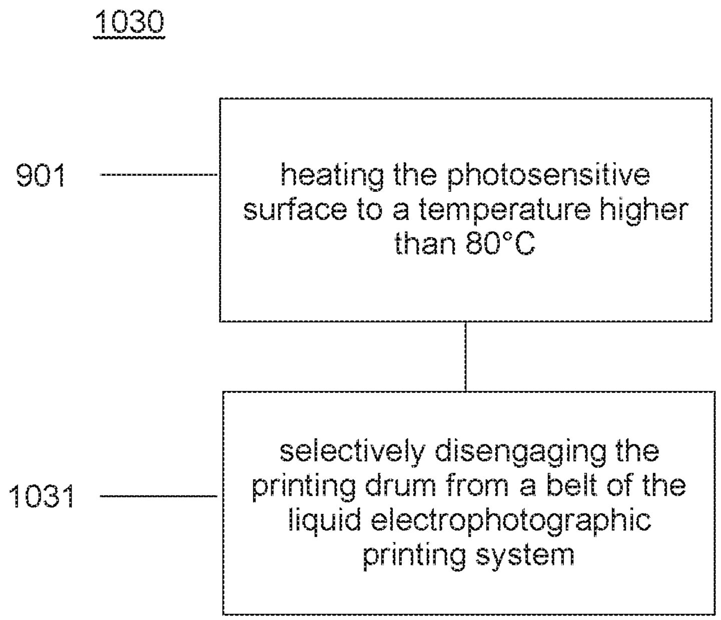

A further example method 1030 for heating the photosensitive surface 102 is shown in FIG. 13. The method 1030 comprises, in addition to block 901 with method 900, a block 1031 of selectively disengaging the printing drum from an intermediate member of the liquid electrophotographic printing system during the print quality enhancing process in block 1031.

Figure 14:
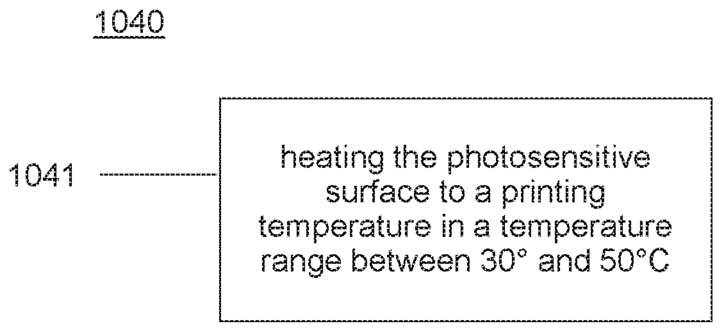

FIG. 14 shows another example method 1040 for heating the photosensitive surface 102. Method 1040 comprises heating the photosensitive surface to a printing temperature in a temperature range between 30° and 50° C. during at least one of a ready-to-print process and a printing process in block 1041. Method 1040 may be performed after a break, standby, or anytime when the printing drum has ambient or colder temperature. Method 1040 may be performed by itself or in combination with any other of methods 900, 1000, 1010, 1020 or 1030.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by the controller.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. Features described in relation to one example may be combined with features of another example.

What is claimed is:

1. A liquid electrophotographic printing system, comprising an intermediate member, at least one printing drum, comprising: a photosensitive surface, a heating device, and a controller electrically coupled with the heating device; wherein the at least one printing drum is selectively engaged with the intermediate member during a press-priming process and wherein the controller is to control the heating device such that the photosensitive surface is heated to a press priming temperature higher than 80° C. to heat the intermediate member during the press-priming process.

2. The liquid electrophotographic printing system according to claim 1, wherein the heating device comprises a plurality of heating pads and the controller is electrically coupled with the plurality of heating pads to control the temperature of the heating pads independently such that the photosensitive surface is heated to the printing temperature in a temperature range between 30° C. and 50° C. during a printing process or a ready-to-print process, and to a print quality enhancing temperature higher than 80° C. during a print quality enhancing process to enhance the print quality of the photosensitive surface; wherein the at least one printing drum is selectively disengaged from the intermediate member during the ready-to-print process and the print quality enhancing process.

3. A method to heat a photosensitive surface of a printing drum in a liquid electrophotographic printing system, comprising:

heating the photosensitive surface with a heating device mounted to the printing drum to a temperature higher than 80° C. during at least one of a print quality enhancing process to enhance the print quality of the photosensitive surface and a press priming process; and selectively engaging the printing drum with an intermediate member of the liquid electrophotographic printing system during a printing process and heating, by means of the heating device of the printing drum, the intermediate member during the printing process.

4. The method according to claim 3, further comprising heating the photosensitive surface with the heating device, which comprises a plurality of heating pads, to a temperature having a predetermined temperature distribution.

5. The method according to claim 3, further comprising heating the photosensitive surface to a printing temperature in a temperature range between 30° and 50° C. during at least one of a ready-to-print process and a printing process.

6. The method according to claim 3, further comprising selectively disengaging the printing drum from the intermediate member of the liquid electrophotographic printing system during the print quality enhancing process.

* * * * *